3,310,595
PROCESS FOR DEODORISING LIQUEFIED HYDROCARBONS, PARTICULARLY COMMERCIAL BUTANE
Georges Molinet, Billere, Basses-Pyrenees, France, assignor to Société anonyme dite: Société Nationale des Petroles d'Aquitaine, Paris, France, a French company
Filed Aug. 26, 1963, Ser. No. 304,385
Claims priority, application France, Aug. 28, 1962, 907,935
12 Claims. (Cl. 260—676)

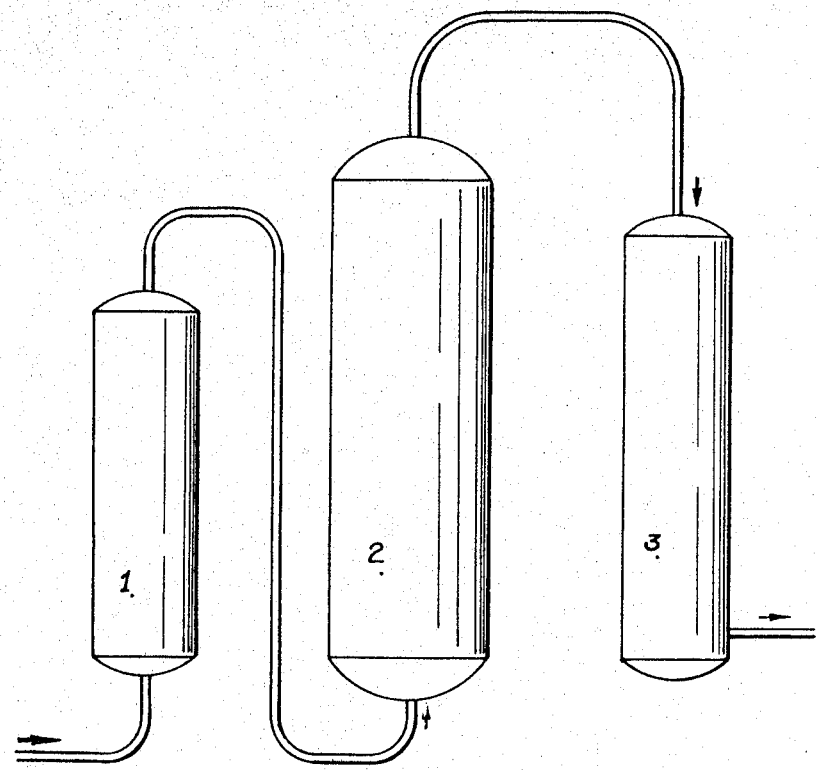

The present invention relates to a process for deodorising liquefied hydrocarbons, particularly commercial butane, especially for the purpose of manufacturing aerosols.

Commercial butane is a mixture of propane, isobutane, n-butane, possibly very small quantities of ethane, pentanes and ethylene hydrocarbons. The evil-smelling impurities contained in the form of traces in commercial butane and making the latter unsuitable for the manufacture of aerosols are generally organic sulphurated compounds, particularly mercaptans. Commercial butane also contains traces carbon oxysulphide, which it is necessary to eliminate in order to prevent the possible hydrolysis of this compound into hydrogen sulphide and carbon dioxide.

The desulphurisation of normally liquid petroleum hydrocarbons by a treatment in the vapour phase or liquid phase at high temperatures by means of porous adsorbents used alone or in admixture with metals or metal oxides in powder form is a process well-known in the petroleum industry.

Nevertheless, the application of such a process to the desulphurisation of liquefied hydrocarbons, of which the content of sulphur compounds is excessively small, for example, in the region of about 10 parts per million, and of which the boiling points at atmospheric pressure are below the ambient temperature, is found to be ineffectual when operating in the liquid phase at relatively low temperatures.

I have now unexepectedly discovered that it is possible to deodorise the liquid hydrocarbons up to $C_5$, particularly commercial butane, by a treatment in the liquid phase at ambient temperature of the said hydrocarbons by means of adsorbents which are super-activated by impregnation by means of soluble organic or mineral compounds of metals preferably selected from the group comprising platinum, silver and nickel.

According to one preferred method of carrying this process into effect, the operation takes place in two phases: in the first phase, the liquefied hydrocarbons to be deodorised are pre-treated with an adsorbent, preferably silica gel or alumina, and in the second phase the pre-treated liquefied hydrocarbons are subjected to the action of an adsorbent which is superactivated by impregnation by means of soluble organic or mineral compounds of metals selected from the group comprising platinum, silver, nickel.

The efficacy of the process according to the invention is due to the fact that the deororisation by adsorption of the evil-smelling compounds by means of porous solids is accompanied by a simultaneous chemical deodorisation by transformation of the mercaptans into mercaptides retained on the porous support, by reaction with the soluble organic or mineral compounds of metals, preferably chosen from platinum, silver and nickel.

Laboratory tests have shown that the adsorbents at present supplied by industry, inter alia, silica gel, alumina, different active carbons, molecular screens, had a more or less high activity, depending on the products to be deodorized. However, silica gel and certain commercial active carbons generally have a better efficacy.

The impregnation of the adsorbents by means of active metal compounds leads to results better than those which are given by these same adsorbents mixed with metal compounds in the form of powder. In addition, the impregnated adsorbents are more suitable for practical use than the mixtures of adsorbents and metal compounds in powder form.

The active carbons, more especially impregnated with silver salts, have a very high efficacy that makes it possible to obtain perfectly deodorised butane which is particularly suitable for the manufacture of aerosols. Other carbons superactivated with other metals such as platinum and nickel also give excellent results.

Experiments have been carried out with other adsorbents, such as silica gel and alumina impregnated with solutions of metal compounds. The silver salts and the nickel salts give very good results. On the other hand, the metal oxides such as those of copper and zinc mixed with silica gel and the oxides of copper, iron, lead, zinc and antimony deposited on the silica gel by thermal decomposition of the corresponding salts are ineffectual.

The control of the deodorisation of the liquefied hydrocarbons is assured, on the one hand by determination of the total sulphur before and after treatment and, on the other hand, by an olfactory test which consists in wetting a strip of perfume test paper with hydrocarbon and in checking the evolution of the odour released during evaporation. The olfactory test is more sensitive than a measurement of the total sulphur and enables a trained operator to choose as a last resort between several envisaged treatments.

One of the treatments particularly recommended uses carbon, on the pores of which has been deposited a film of fine metal particles. All the methods enabling this result to be obtained are available for this purpose. Among other methods, it is possible to mention by way of example the reduction of salts by carbon at more or less high temperature, as well as the decomposition of metal compounds by heat. The metal compound may only be partially reduced by the carbon. The deposit on this latter is then formed of metal, oxide (or oxides) of the metal and of the unreduced metal compound.

Various methods of preparing the different impregnated adsorbents will be described in the following examples.

EXAMPLE 1.—CARBON SUPERACTIVATED WITH SILVER 1 kg. of commercial active carbon, in the form of small cylinders with a length of 8 mm. and a diameter of 3 mm., is initially dried for 12 hours at 110° C., then immersed in 1500 ml. of a 0.1 N aqueous solution of silver nitrate for 15 minutes, while being gently stirred.

After being drained, the carbon is dried for 48 hours in an oven at 105–110° C. The impregnated carbon had absorbed 2.4% of $AgNO_3$, of which 50% of silver is in free form and oxide form, i.e. Ag=0.75%.

The density of the compressed carbon is equal to 0.420. Its pH value, after drying, is 6.9.

EXAMPLE 2.—CARBON SUPERACTIVATED WITH PLATINUM

The same commercial active carbon is dried as previously indicated in Example 1, then immersed for 15 minutes at the rate of 1 kg. of dry carbon in 2000 ml. of aqueous solution containing 35 g. of hexahydrated chloroplatinic acid.

The drained carbon is dried for 4 hours in an oven at 300° C. The pH of the dry impregnated carbon is equal to 5.9.

EXAMPLE 3.—CARBON SUPERACTIVATED WITH NICKEL

The operation is carried out as indicated above in Example 1 for the drying of the adsorbent. 1 kg. of dry carbon is immersed for 15 minutes in 1500 ml. of an aqueous solution of 0.1 N nickel sulphate aqueous solution. After draining, the carbon is dried for 3 hours at 120° C. and then it is immersed for 15 minutes in 2500 ml. of a 1/16 N aqueous solution of sodium carbonate. The carbon is again drained and then it is dried for 4 hours in an oven at 300° C.

The impregnated carbon has a pH value of 7.4.

EXAMPLE 4.—SILICA GEL IMPREGNATED WITH SILVER NITRATE 1 kg. of ultra-microporous commercial silica gel is dried for 12 hours at 180° C.

The dry product is soaked for 15 minutes in 1000 ml. of a 0.1 N aqueous solution of silver nitrate. After being drained, the gel is dried for 4 hours at 120° C. The pH value of the gel is equal to 3.0.

EXAMPLE 5

In the same manner as that described in Example 4, ultra-microporous silica gel is impregnated with different metal oxides. For the impregnation, there is used an aqueous solution of nitrate (for the following metals: Cu, Fe, Pb, Zn) or of chloride (Sb) and this is decomposed to the oxide state at a temperature between 90 and 150° C.

EXAMPLE 6.—ALUMINA IMPREGNATED WITH SILVER NITRATE 1 kg. of activated alumina, in the form of balls with a diameter of 7 mm., is dried for 12 hours at 110° C., then placed for 15 minutes in 1500 ml. of 0.1 N silver nitrate solution.

After draining, the alumina is kept for 48 hours at 105–110° C.

The impregnated and dried alumina has a pH value equal to 6.0.

EXAMPLE 7.—DEODORISATION OF COMMERCIAL BUTANE

The deodorisation treatment of commercial butane is carried out in two phases: a contact with silica gel followed by a contact with carbon superactivated with silver.

The deodorisation plant is illustrated diagrammatically in the accompanying drawing.

The butane, previously freed from carbon oxysulphide by washing with an aqueous solution of monoethanolamine and then dried on a crystallised sodium chloride column 1 is conveyed in the liquid state, first of all into a first tower 2 lined with dry ultra-microporous silica gel and then into a second tower 3 lined with carbon superactivated with silver.

It is necessary to operate in the absence of air in order to avoid any parasitic oxidation of the evil-smelling impurities contained in the commercial butane. The contact time between the liquid butane and the adsorbent varies according to the quantity of impurities to be eliminated. The treatment is carried out at ambient temperature, the plant being in the open air; the pressure is that of the butane at the temperature in question. In the summer, it is recommended to cool the towers in order to avoid a rise in temperature which could be prejudicial to the adsorption.

By way of example, satisfactory results have been obtained with contact times varying from 3 to 10 minutes.

The total sulphur content of the deodorised butane is in the region of 1 part per million (p.p.m.) by weight when the total sulphur content of the initial butane is about 10 p.p.m.

It is obvious that the passage through the adsorption towers can be replaced by any other treatment technique, such as static treatment, fluidised bed, etc. provided that the contact period is sufficient to eliminate the evil-smelling compounds.

The results obtained in the deodorisation treatment of a commercial butane using different adsorbents are given below by way of example. The commercial butane, previously freed from ethylene hydrocarbons and with a total sulphur content of 10 p.p.m. is pretreated for 3 minutes by static contact with ultra-microporous silica gel.

The pretreated butane only contains 2.80 p.p.m. of total sulphur. Each treatment proper lasts 3 minutes.

| Carbon impregnated with— | Total sulphur (p.p.m.) after deodorisation | Carbon mixed with metal salts in powder form | Total sulphur (p.p.m.) after deodorisation |
|---|---|---|---|
| Platinum | 0.20 | | |
| Silver | 0.38 | $AgNO_3$ | 0.58 |
| Nickel | 0.57 | $NiSO_4$ | 0.72 |
| Unimpregnated carbon | 0.69 | | |

| Ultra-microporous silica gel impregnated with— | Total sulphur (p.p.m.) after deodorisation | Ultra-microporous silica gel mixed with metal compounds in powder form | Total sulphur (p.p.m.) after deodorisation |
|---|---|---|---|
| $AgNO_3$ | 0.24 | $AgNO_3$ | 0.30 |
| $NiSO_4$ | 0.56 | $NiSO_4$ | 0.60 |
| $Cu(NO_3)_2$ | 0.90 | | |
| $Zn(NO_3)_2$ | 0.80 | | |
| $Fe(NO_3)_3$ | 0.95 | | |
| $Pb(NO_3)_2$ | 0.84 | | |
| $SbCl_3$ | 0.92 | | |
| Unimpregnated silica gel | 0.78 | | |
| $Al_2(SO_4)_3$ | 0.80 | $Al_2(SO_4)_3$ | 0.90 |
| | | $CuO$ | 1.10 |
| | | $ZnO$ | 1.10 |

| Alumina impregnated with— | Total sulphur (p.p.m.) after deodorisation | Alumina mixed with metal salts in powder form | Total sulphur (p.p.m.) after deodorisation |
|---|---|---|---|
| $AgNO_3$ | 0.47 | $AgNO_3$ | 0.50 |
| $Al_2(SO_4)_3$ | 0.76 | $Al_2(SO_4)_3$ | 0.80 |
| Unimpregnated alumina | 1.90 | | |

It can be concluded from a study of the above table that the metals do not behave in the same manner either in the case of mixtures or in the case of the impregnation, which moreover leads to clearly better results. The silver, platinum and nickel enable the best deodorisation to be obtained by impregnation of the metals and/or their compounds.

I claim:

1. A process for deodorising a liquefied hydrocarbon having from 1 to 5 carbon atoms, and containing a very small amount of sulfur compounds, which comprises contacting said liquefied hydrocarbon at ambient temperatures with an adsorbent material superactivated by impregnation with a compound selected from the group consisting of a soluble compound of a metal selected from the group consisting of platinum, silver and nickel.

2. A process according to claim 1, wherein the hydrocarbon is commercial butane.

3. A process according to claim 1, wherein the adsorbent material is silica gel superactivated by impregnation with silver nitrate.

4. A process according to claim 1, wherein the adsorbent material is active carbon.

5. A process according to claim 1, wherein the liquefied hydrocarbon to be treated has a sulfur content in the order of about 10 parts per million, and after treatment has a sulfur content of less than one part per million.

6. A process according to claim 1, wherein the adsorbent material is selected from the group consisting of silica gel, activated alumina and active carbon.

7. A process for deodorising a liquefied hydrocarbon having from 1 to 5 carbon atoms which comprises (a) a pretreatment comprising initially contacting said liquefied hydrocarbon with an unimpregnated adsorbent material, and
(b) a subsequent treatment comprising contacting said liquefied hydrocarbon with an adsorbent material superactivated by impregnation with a soluble compound of a metal selected from the group consisting of platinum, silver and nickel.

8. A process according to claim 7, wherein the pretreating adsorbent material used in the pretreatment is silica gel.

9. A process according to claim 7, wherein the pretreating adsorbent material used in the pretreatment is alumina.

10. A process according to claim 7, wherein the superactivated adsorbent is material used in the subsequent treatment is active carbon.

11. A process according to claim 7, wherein the adsorbent material used in the subsequent step is silica gel and the impregnating compound is silver nitrate.

12. A process according to claim 7, wherein the unimpregnated adsorbent material used in (a) is silica gel and the adsorbent material used in (b) is active carbon.

References Cited by the Examiner
UNITED STATES PATENTS

| | | | |
|---|---|---|---|
| 1,926,226 | 9/1933 | Cannon | 208—197 |
| 2,042,054 | 5/1936 | Hoover | 208—191 |
| 2,314,576 | 3/1943 | Doran | 208—249 |
| 2,884,377 | 4/1959 | Bozich et al. | 260—676 |
| 3,178,487 | 4/1965 | Daendliker | 260—676 |
| 3,203,891 | 8/1965 | Holden | 208—217 |

ALPHONSO D. SULLIVAN, *Primary Examiner.*